United States Patent

Kappenhagen

[15] 3,654,514
[45] Apr. 4, 1972

[54] SOLID-STATE PHOTOCONTROL APPARATUS FOR LIGHTING LOADS

[72] Inventor: George A. Kappenhagen, Northfield, Ohio
[73] Assignee: Westinghouse Electric Corporation, Pittsburgh, Pa.
[22] Filed: Oct. 12, 1970
[21] Appl. No.: 80,081

[52] U.S. Cl. ............................................. 315/156, 315/159
[51] Int. Cl. .................................. H05b 37/02, H05b 39/04
[58] Field of Search ........................................... 315/156, 159

[56] References Cited

UNITED STATES PATENTS 3,450,939  6/1969  Misenheik ............................. 315/156

Primary Examiner—Nathan Kaufman
Attorney—A. T. Stratton, W. D. Palmer and D. S. Buleza

[57] ABSTRACT

A simple solid-state photocontrol apparatus for controlling the operation of lighting loads comprises a series-connected rectifier and RC combination which generates a DC potential. A series-connected photocontrol element and a fixed resistor connect to the generated DC potential and under nighttime conditions, an increased potential is developed across the photocontrol element. The gate circuit of an AC symmetrical switch is connected intermediate the fixed resistor and the photocontrol element, and when the voltage applied to the gate circuit reaches a predetermined value as nighttime approaches, the AC symmetrical switch conducts to operate the lighting load. The AC symmetrical switch remains conducting until the resistance of the photocontrol element again decreases due to daytime conditions.

10 Claims, 7 Drawing Figures

Patented April 4, 1972

3,654,514

ASSEMBLY SIDE

COPPER SIDE PRINTING

INVENTOR
George A. Kappenhagen

BY
W. D. Palmer
ATTORNEY

3,654,514

SOLID-STATE PHOTOCONTROL APPARATUS FOR LIGHTING LOADS

BACKGROUND OF THE INVENTION

In U.S. Pat. No. 3,450,939 dated June 17, 1969 to Misencik is disclosed a solid-state device for controlling the operation of lighting loads, which for this device are preferably of a resistive nature. The apparatus which is disclosed in this patent applied a gating pulse to an AC symmetrical switch each half cycle of energizing potential. With highly inductive loads, the gating pulse can be terminated before the energizing half cycle of load operation is completed.

In copending application Ser. No. 807,711, filed Mar. 17, 1969, and owned by the present assignee, is disclosed a photocontrol apparatus for lighting loads wherein a rectifier bridge provides a DC source which is applied across a photocontrol circuit. The output of the photocontrol circuit is used to energize a level detector circuit, with the output of this level detector circuit applied to the gate of a symmetrical AC switch. While this circuit operates very satisfactorily, it is relatively complicated and thus expensive.

In U.S. Pat. No. 3,483,429, dated Dec. 9, 1969 by Engel et al, is disclosed still another modified solid-state photocontrol unit in which gating pulses are provided every other half cycle of energizing potential.

SUMMARY OF THE INVENTION

In accordance with the present invention, the apparatus comprises input terminals which are adapted to be connected across a source of AC energizing potential and output terminals which are adapted to have a lighting load device connected thereacross. A solid-state AC symmetrical switch is connected between one of the input terminals and one of the output terminals and the switch is adapted to be gated to a conducting condition by the application thereto of a predetermined unidirectional electric signal. A rectifier and RC combination comprises a solid-state rectifier which is connected in series with a parallel-connected resistor and capacitor which have a time constant of predetermined magnitude substantially greater than the period for one cycle of the source of AC energizing potential. The rectifier and capacitor of the RC combination are electrically connected in circuit across the input terminals of the apparatus so that a DC potential is generated between the rectifier and the RC combination. The fixed resistance of the RC combination and a light-responsive variable resistance (the photocell) are series connected and the fixed resistance is connected at a tap between the rectifier and the capacitor with the other connection for the photoconductor being to the input terminal. A voltage-responsive gate-current-controlling device connects between the junction of the fixed resistance and the photoconductor and the gate of the AC symmetrical switch. When the resistance of the photoconductor increases due to nighttime conditions, the potential developed thereacross increases and gates the AC symmetrical switch to operate the lighting load. The AC symmetrical switch will be gated until the resistance of the photoconductor decreases sufficiently to remove the gating signal from the AC symmetrical switch.

BRIEF DESCRIPTION OF THE DRAWINGS

For a better understanding of the invention, reference may be had to the exemplary embodiment as shown in the accompanying drawings, in which.

DESCRIPTION OF THE PREFERRED EMBODIMENT

Figure 1:
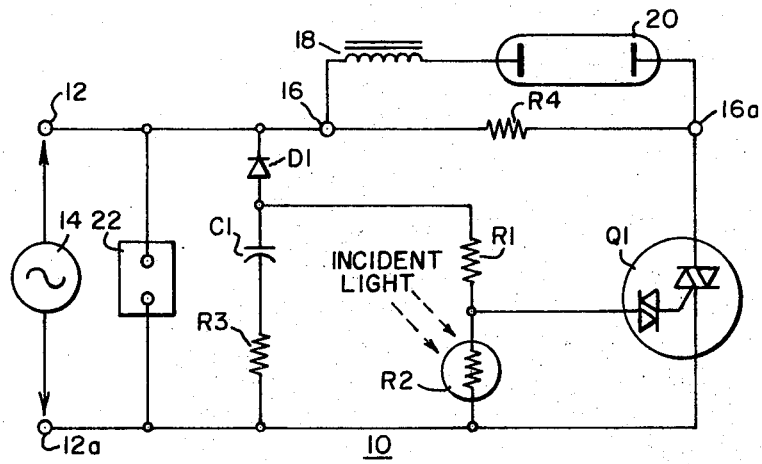
FIG. 1 is a schematic view of the photocontrol apparatus of the present invention.

The photocontrol apparatus 10 generally comprises input terminals 12 and 12a which are adapted to be connected across a source 14 of AC energizing potential, such as 240 volt 60 Hz, and output terminals 16 and 16a which are adapted to have a lighting load device connected thereacross. In the embodiment as shown, the lighting load device comprises a conventional reactor 18 and conventional high-pressure mercury-vapor discharge device 20. A solid-state AC symmetrical switch Q1 is connected between one of the input terminals 12a and one of the output terminals 16a and the switch Q1 is designed to be gated to an electrical conducting condition by the application thereto of a minimum predetermined unidirectional electric signal.

A rectifier and RC combination comprise a solid-state rectifier, such as diode D1, connecting in series with a parallel-connected capacitor C1 and fixed resistor R1 which have a predetermined time constant of magnitude substantially greater than the period for one cycle of AC energizing potential of source 14. As an example, the time constant of the combination C1, R1 is 300 milliseconds. The rectifier D1 and capacitor C1 are electrically connected across the input terminals 12, 12a and a DC potential is generated at the junction of R1 and C1. As shown in FIG. 1, one end of the resistor R1 connects to the junction between rectifier D1 and the capacitor C1, and a light-responsive variable resistance means R2 which is a photoconductor, connects between the other end of the fixed resistor R1 and the input terminal 12a. As is conventional, the photoconductor R2 displays a low value of resistance during daylight hours and a high value of resistance during nighttime hours.

A voltage-responsive gate-controlling device connects between the junction of R1, R2 and the gate of the AC symmetrical switch Q1. In some cases these AC symmetrical switches have a voltage-responsive gate-current controlling device built therein, or, alternatively, additional semiconductor devices can be included in the circuit, as will be explained hereinafter.

As a specific example, the capacitor C1 has a value of 12 microfarads, the resistor R1 has a value of 25kΩ, and the photocontrol R2 displays a variable resistance depending upon the ambient lighting conditions.

It is desirable to incorporate a current limiting or surge resistor R3 into the circuit to minimize any heavy surge of current through the diode D1 when the power is initially applied. As an example, the resistor R3 has a value of 62 ohms and will dissipate one-half watt. It is also desirable to parallel the load with a resistor R4 which has a high resistance value of 470 kilo ohms, for example, in order to eliminate any dv/dt noise from appearing across the semiconductor switch Q1. Also, as is conventional in such designs, a lighting arrester 22 can be connected across the input terminals 12, 12a.

Figure 2:
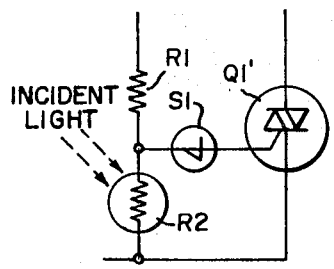
FIG. 2 is a circuit diagram of a modified gate-current-controlling arrangement which incorporates a unidirectional trigger diode.
Figure 3:
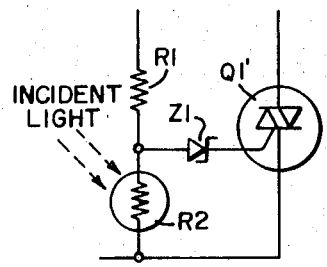
FIG. 3 is a view similar to FIG. 2 except that the circuit is modified to incorporate a Zener diode as a voltage-responsive gate-current-controlling device.
Figure 4:
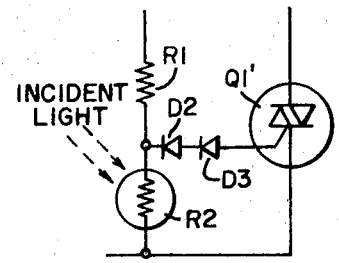
FIG. 4 is a view corresponding to FIGS. 2 and 3 except that two diodes are utilized in series as a voltage-responsive gate-current-controlling device.

It may be desirable to incorporate a unidirectional trigger diode S1 as the voltage-responsive gate-controlling device and such an alternative embodiment is disclosed in FIG. 2. The device can also incorporate a Zener diode Z1 as shown in the embodiment of FIG. 3 or two parallel-connected conventional diodes D2 and D3 as shown in the embodiment of FIG. 4. If desired any combination of trigger diodes, Zener diodes and conventional diodes may also be used in the gate circuit to obtain the desired characteristics.

The operation of the foregoing apparatus is best explained in detail by considering the following design examples:

EXAMPLE I

Circuit parameters: Voltage source (nominal voltage) = 240 volts; $R1 = 12\ k\Omega$; S1 has a breakdown voltage of 50 volts and a holding current of 8 ma.; Q1 gate voltage required for firing = 40 volts.

1. I(nominal) through $R1 = V(\text{nominal})/R1 = 240\ \text{volts}/12k\ \Omega = 20\ \text{ma}$.
2. V(turn-on) for $Q1 = 50\ v + 40\ v = 90\ v$.
3. Resistance of $R2$ at turn-on $= 90\ v/20\ ma = 4.5 \times 10^3$.
4. Current through $R2$ at $40\ v = 40v/4.5 + 10^3 = 9$ ma.
5. After turn-on, I through the gate of Q1 at $40\ v = 20-9$ ma $= 11$ ma.

In the operation of this specific apparatus, during the daylight hours, R2 is in a very low impedance condition, and the continuous current through R1 is 20 ma. Under such conditions, no current will be conducted through the gate of Q1. Under approaching conditions of darkness, when the resistance of R2 is 4,500 ohms, a total of 90 volts required for turn-on will be developed across R2 and the symmetrical switch Q1 will conduct. This conduction will continue until daylight again approaches and the resistance of R2 decreases sufficiently that the gate current through S1 will not be maintained.

EXAMPLE II

Circuit parameters: Voltage source (nominal) = 250 volts; $R1 = 20\ k\Omega$; S1 has a breakdown potential of 20 volts and a holding current of 8 ma; and a Zener diode rated at 3.9 volts is included. The voltage required for firing is thus 23.9 volts.

1. I(nominal) through $R1 = 250\ v/20\ k\Omega = 12.5$ ma. =
2. V(turn-on) for $Q1 = 23.9$ volts.
3. Resistance of $R2$ at turn-on $= 23.9v/12.5ma = 1.91\ k\Omega$.
4. Current through $R2$ at 3.9 volts $= 3.9v/1.91 \times 10^3 = 2.04$ ma.
5. After turn-on, I through gate of Q1 at 3.9 volts = 12.5 − 2.05 = 10.46 ma.

While the foregoing two examples consider in detail specific designs for the apparatus, many different modifications to the circuit may be made since each change in elements will require the remaining elements to be modified accordingly. In Example I, the continuous drain during daylight hours is 20 ma. and such a low level of loss is completely acceptable. Under Example II, the continuous drain on the circuits is only 12 ma.

In the foregoing specific embodiments, the relatively high initial breakdown voltage of 90 volts and 23.9 volts provides the apparatus with a so-called hysteresis effect in that a considerably higher level of ambient lighting is required to turn "off" the apparatus than is required to turn the apparatus "on".

In the preferred form of the apparatus, the AC symmetrical switch Q1 incorporates a semiconductor device in the gate circuit thereof to eliminate any tendency for non-symmetrical triggering thereof, and the incorporation of the unidirectional trigger diode, as shown in FIG. 2, will accomplish the same result. Such an apparatus will operate well with all types of loads, such as inductive loads, with or without power factor correction, regulated output ballast loads, leading loads, and, of course, resistive loads such as are encountered with incandescent lamps.

The present photocontrol apparatus is extremely simple in overall construction and quite economical to make. The entire device can be placed upon a printed circuit board and for protection need only be dipped in a semi-flexible material, such as epoxy resin, for example. During operation, gate current is continuously applied to the AC symmetrical switch and with the proper selection of circuit elements, the apparatus will operate equally well with resistive loads or lagging loads or leading loads.

Figure 5:
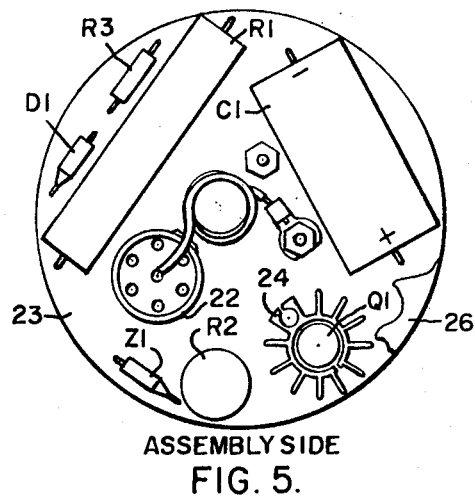
FIG. 5 is a top view of a practical embodiment of the apparatus wherein the electrical components comprising the apparatus are mounted on a printed circuit board.
Figure 6:
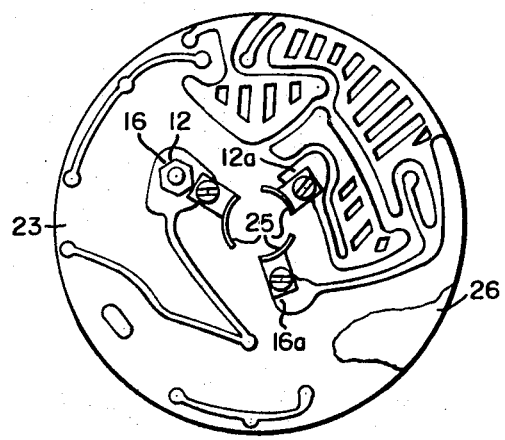
FIG. 6 is a bottom view of the apparatus shown in FIG. 5, wherein the electrical connections are made through a twist-lock connector mounted on the bottom of the printed circuit board.

In FIGS. 5 and 6 are shown a practical embodiment of the apparatus 10. As shown in FIG. 5, the printed circuit board 23 has mounted on the upper surface thereof the principal components of the apparatus. In this embodiment, the switch Q1 is surrounded by a heat sink 24. As shown in FIG. 6, the input terminals 12 and 12a, as well as the output terminals 16 and 16a are connected through a conventional three-pronged twist-lock connector 25 to facilitate installation and replacement of the apparatus. Preferably the apparatus is dipped in a protective coating 26, shown broken away in FIGS. 5 and 6, which is thus applied directly on the apparatus 10.

Figure 7:
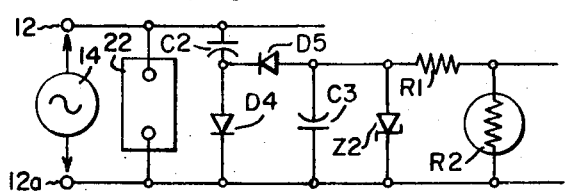
FIG. 7 is a schematic view of a modified gating circuit for the AC symmetrical switch Q1.

A modified gating circuit for the AC symmetrical switch Q1 is shown in FIG. 7. In this embodiment, on one half cycle of energizing potential, current flows through C2 and D4. On the next half cycle of energizing potential, current flows through C3 and D5. Z2 limits the voltage to which C3 charges. The purpose of this modified gating circuit is to limit the power losses in R1 since the maximum voltage which is applied thereacross is limited by Z2.

As another embodiment, any of the voltage-responsive gate-current controlling devices, such as S1, Z1, and D2–D3, can be replaced by other devices such as a Schmitt trigger circuit.

I claim as my invention:

1. A photocontrol apparatus for controlling the application of alternating current energizing potential to a lighting device in response to a predetermined level of ambient lighting, said apparatus comprising:
    a. input terminals adapted to be connected across said source of AC energizing potential, and output terminals adapted to have a lighting load device connected thereacross;
    b. a gate-controlled solid state AC symmetrical switch connected between one of said input terminals and one of said output terminals, said switch adapted to be gated to an electrical conducting condition by the application thereto of a predetermined unidirectional electric signal;
    c. a rectifier and RC combination comprising a solid-state rectifier connecting in series with a parallel-connected capacitor and fixed resistor which have a predetermined time constant of magnitude substantially greater than the period of one cycle of said source of AC energizing potential, and said rectifier and said capacitor electrically connected in circuit across said input terminals;
    d. the fixed resistor of said RC combination having one end thereof connected to the junction between said rectifier and said capacitor, and a light-responsive variable resistance means connected between the other end of said fixed resistor and in circuit with said one input terminal, said variable resistance means displaying a low value of resistance during daylight hours and a high value of resistance during the nighttime hours; and
    e. voltage-responsive gate-current controlling means connecting between the junction of said fixed resistor and said variable resistance means and the gate of said symmetrical switch, said voltage-responsive gate-current controlling means operable to pass current therethrough to gate said symmetrical switch only when at least a minimum predetermined potential is applied thereacross; whereby during hours of daylight the potential developed across said variable resistance means is insufficient to cause said symmetrical AC switch to be gated, and during hours of darkness the increased potential developed across said variable resistance means is sufficient to cause said symmetrical AC switch to be gated and thus to apply a lighting load operating potential across said output terminals.

2. The apparatus as specified in claim 1, wherein a current-limiting resistor connects between said capacitor and said one input terminal.

3. The apparatus as specified in claim 1, wherein said voltage-responsive gate-current controlling means comprises a unidirectional trigger diode which avalanches upon application thereacross of said minimum predetermined potential.

4. The apparatus as specified in claim 1, wherein said voltage-responsive gate-controlling means comprises a Zener diode.

5. The apparatus as specified in claim 1, wherein said voltage-responsive gate-controlling means comprises series connected diodes which will conduct only on the application thereacross of said minimum predetermined potential.

6. The apparatus as specified in claim 1, wherein lighting arrester means is directly electrically across said input terminals.

7. The apparatus as specified in claim 1, wherein said load comprises a discharge lamp and associated inductive ballast.

8. The apparatus as specified in claim 7, wherein a high resistance of predetermined value connects across said output terminals.

9. The apparatus as specified in claim 1, wherein the electrical components comprising said apparatus are mounted on one surface of a printed circuit board, and said input terminals and said output terminals are connected to a twist-lock connector which is mounted on the other surface of said printed circuit board.

10. The apparatus as specified in claim 9, wherein said electrical components comprising said apparatus are encased by a protective coating applied directly thereon.

* * * * *